United States Patent
Ngo et al.

(10) Patent No.: US 9,094,788 B2
(45) Date of Patent: *Jul. 28, 2015

(54) CENTRALIZED DATA STORE FOR PROVIDING ALL PLACE-RELATED DATA TO APPLICATIONS ON A MOBILE DEVICE

(75) Inventors: Ngoc Bich Ngo, Ottawa (CA); Siamak Sartipi, Waterloo (CA); Jason Christopher Beckett, Kitchener (CA); Hai Quang Pham, Nepean (CA)

(73) Assignee: BlackBerry Limited, Waterloo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/566,124

(22) Filed: Aug. 3, 2012

(65) Prior Publication Data

US 2014/0038635 A1 Feb. 6, 2014

(51) Int. Cl.
*H04W 24/00* (2009.01)
*H04W 4/02* (2009.01)
(52) U.S. Cl.
CPC .................................... *H04W 4/02* (2013.01)
(58) Field of Classification Search
USPC .......... 455/456.3, 456.1, 456.2, 456.5, 456.6, 455/457, 414.2; 705/7.34, 14.57, 14.58, 705/26.9, 346; 379/207.12
See application file for complete search history.

(56) References Cited

U.S. PATENT DOCUMENTS

| | | | |
|---|---|---|---|
| 7,103,420 B2 | 9/2006 | Brown et al. | |
| 7,912,837 B2 | 3/2011 | Buron et al. | |
| RE42,285 E | 4/2011 | Anderson et al. | |
| 7,925,272 B2 | 4/2011 | Hjelm et al. | |
| 8,250,096 B2 | 8/2012 | Su et al. | |
| 8,285,716 B1 | 10/2012 | Srinivasaiah | |
| 2003/0023726 A1 | 1/2003 | Rice et al. | |
| 2005/0108213 A1 | 5/2005 | Riise et al. | |
| 2005/0270311 A1* | 12/2005 | Rasmussen et al. | 345/677 |
| 2006/0101005 A1 | 5/2006 | Yang et al. | |
| 2006/0141985 A1 | 6/2006 | Patel et al. | |
| 2006/0149734 A1 | 7/2006 | Egnor et al. | |
| 2006/0149742 A1 | 7/2006 | Egnor | |
| 2007/0198495 A1 | 8/2007 | Buron et al. | |
| 2008/0270366 A1 | 10/2008 | Frank | |
| 2009/0171686 A1 | 7/2009 | Eberstadt | |
| 2009/0240564 A1 | 9/2009 | Boerries et al. | |

(Continued)

FOREIGN PATENT DOCUMENTS

DE 202013000058 U1 2/2013
EP 2348423 A2 7/2011

(Continued)

OTHER PUBLICATIONS

European Search report from related EP application No. 12179322.8 dated Apr. 5, 2013.
European search report from related EP application 12006307.7 dated Dec. 12, 2012.

(Continued)

*Primary Examiner* — Shahriar Behnamian
(74) *Attorney, Agent, or Firm* — Moffat & Co.

(57) ABSTRACT

A method of managing place data for a mobile device, the method comprising storing place data for the mobile device in a centralized place data store, the centralized place data store storing location data for each of a plurality of places defined by the mobile device, and in response to place data requests from a plurality of applications executing on the mobile device, providing the place data from the centralized place data store to the plurality of applications.

20 Claims, 17 Drawing Sheets

(56) References Cited

U.S. PATENT DOCUMENTS

| | | | |
|---|---|---|---|
| 2009/0241040 A1* | 9/2009 | Mattila et al. | 715/760 |
| 2009/0282003 A1* | 11/2009 | Hirata | 707/3 |
| 2010/0331016 A1 | 12/2010 | Dutton et al. | |
| 2011/0105143 A1 | 5/2011 | Harple et al. | |
| 2011/0289433 A1 | 11/2011 | Whalin et al. | |
| 2012/0011167 A1* | 1/2012 | Schmidt | 707/802 |
| 2012/0042036 A1 | 2/2012 | Lau et al. | |
| 2012/0110458 A1 | 5/2012 | Brown et al. | |
| 2012/0290977 A1 | 11/2012 | Devecka | |
| 2012/0290979 A1 | 11/2012 | Devecka | |
| 2013/0019185 A1 | 1/2013 | Zhang | |
| 2013/0058632 A1 | 3/2013 | Jackson | |
| 2013/0065613 A1* | 3/2013 | Stopel et al. | 455/456.3 |
| 2013/0102328 A1* | 4/2013 | Kalofonos et al. | 455/456.2 |

FOREIGN PATENT DOCUMENTS

| | | | | |
|---|---|---|---|---|
| WO | 2009151928 A2 | 12/2009 | | |
| WO | 2011053909 A1 | 5/2011 | | |
| WO | 2013084032 A1 | 6/2013 | | |
| WO | WO2013084032 | * | 6/2013 | H04W 64/00 |

OTHER PUBLICATIONS

European search report from related EP application 112179321.0 dated Mar. 15, 2013.

European search report from related EP application 12182694.5 dated Apr. 24, 2013.

International Search Report dated Oct. 15, 2013 from related PCT application No. PCT/CA2013/000668.

European Office Action dated Oct. 29, 2014 which issued on related EP Application No. 12006307.8.

United States Office Action dated Nov. 20, 2014 which issued on related U.S. Appl. No. 13/744,946.

United States Office Action dated Dec. 4, 2014 which issued on related U.S. Appl. No. 14/044,225.

United States Office Action dated Jan. 8, 2015 which issued on related U.S. Appl. No. 13/745,123.

EP 2706496 (English) which corresponds to cited DE 202013000058.

European Search Report dated Oct. 14, 2014 which issued on related EP Application No. 14183399.6.

United States Patent and Trademark Office, Final Office Action, Application No. 14044225, Apr. 7, 2015.

* cited by examiner

CENTRALIZED DATA STORE FOR PROVIDING ALL PLACE-RELATED DATA TO APPLICATIONS ON A MOBILE DEVICE

CROSS-REFERENCE TO RELATED APPLICATIONS

This is the first application filed for the present technology.

TECHNICAL FIELD

The present technology relates generally to mobile devices and, in particular, to location-based services for mobile devices.

BACKGROUND

Mobile devices or wireless communications device may offer location-based services (LBS). In a traditional paradigm, each application on the device that utilizes location data (e.g. maps, calendar, address book, instant messaging, etc.) stores its own location data. This redundant data is not only duplicated on the device but techniques for sharing of this data across applications are presently quite limited. Improvements on the foregoing are thus highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
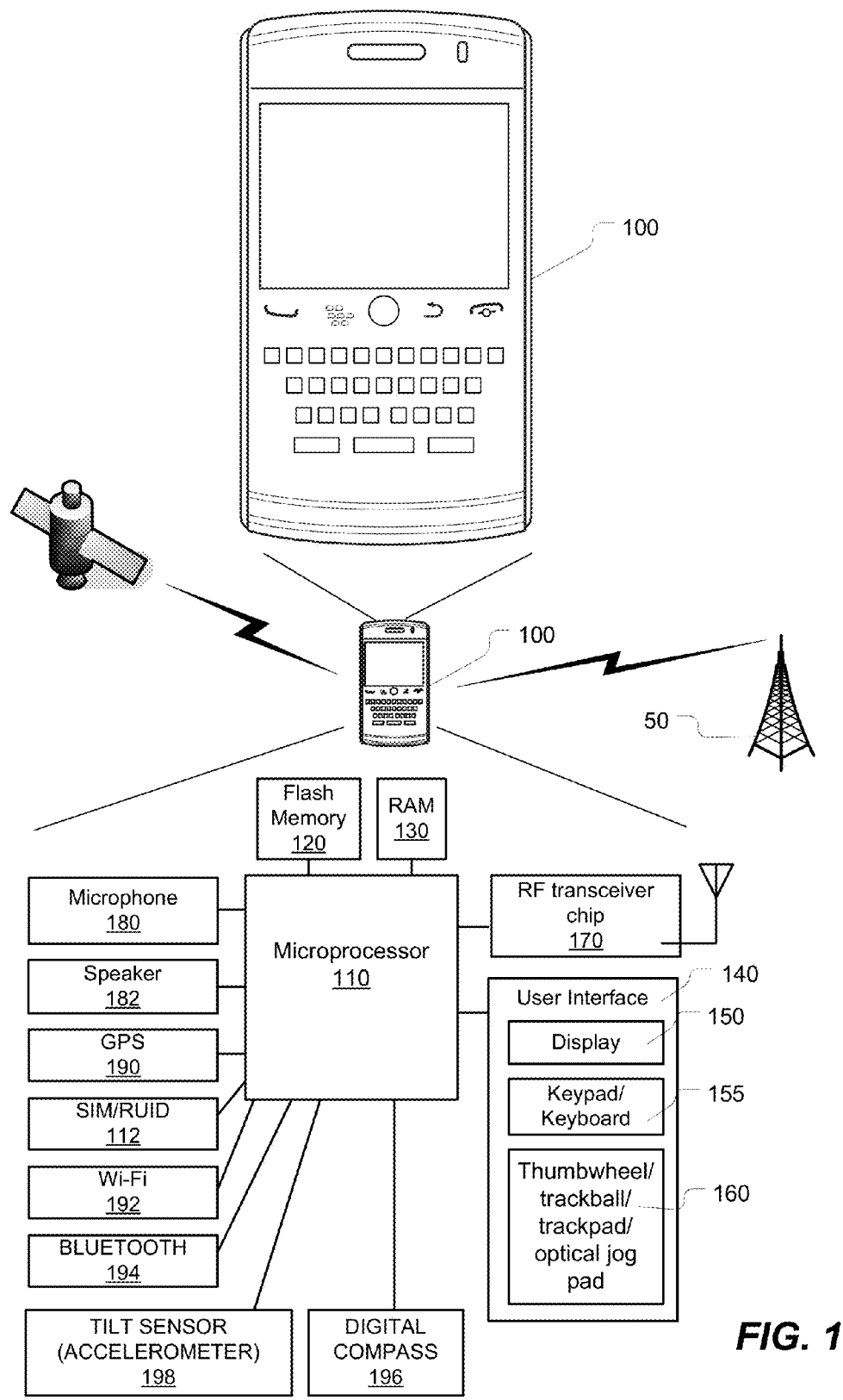
FIG. 1 is a depiction of a mobile device on which the present technology may be implemented, the depiction including a schematic depiction of some components of the mobile device.

The present technology provides a novel system and method that implements a novel place data paradigm for managing, using and presenting place data. Dispensing with the conventional data silos for place or location data on a device, the present technology creates a centralized place database on or accessible by the device so that all applications that utilize place data may obtain the place data from this centralized place database. This technique may ensure that the place data is used, presented and managed in a consistent manner. It may also permit place data to be shared with an efficiency and ease that was not previously possible. The centralized place database may furthermore collect, aggregate, and collate place-related information and content for each place specified by the user or identified by the device. This collation of place data may centralize and consolidate all of the place-related information and content for a given place. This place-centric paradigm may enable the device to present to the user all of the relevant content for a specific place. The device may thus present, in one view, content that would otherwise be viewable only through each separate applications: meetings, tasks, events, news, weather, etc. that occur at or near the place, or which have some relevancy or connection to the place.

Accordingly, one aspect of the present technology is a method of managing place data for a mobile device, the method comprising storing all place data for the mobile device in a centralized place data store, the centralized place data store storing place data for each of a plurality of places, and in response to place data requests from a plurality of applications executing on the mobile device, providing the place data from the centralized place data store to the plurality of applications.

Another aspect of the present technology is a computer-readable medium comprising instructions in code which when loaded into a memory and executed by a processor of a mobile device cause the mobile device to store all place data for the mobile device in a centralized place data store, the centralized place data store storing place data for each of a plurality of places and, in response to place data requests from a plurality of applications executing on the mobile device, provide the place data from the centralized place data store to the plurality of applications.

Another aspect of the present technology is a mobile device having a position-determining subsystem for determining a position of the mobile device, a memory for storing all place data for the mobile device in a centralized place data store for each of a plurality of places, and a processor operatively coupled to the memory for executing a plurality of applications, to determine when place data is required for the applications, and to obtain all of the place data required for all applications on the mobile device from the centralized place data store.

The details and particulars of these aspects of the technology will now be described below, by way of example, with reference to the drawings.

FIG. 1 is a depiction of a wireless communications device as one example of a mobile device that may be used to implement this novel technology. Examples of a mobile device or wireless communications device include cell phones, smart phones, mobile phones, portable digital assistants, or any other such portable or handheld electronic communications devices.

As shown by way of example in FIG. 1, the mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications and, in this instance, for receiving user input to set up a call to another device. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the mobile device 100 may include a wireless transceiver 170 for communicating with other devices. The transceiver 170 may be a radiofrequency (RF) transceiver for wirelessly communicating with one or more base stations 50 over a cellular wireless network using cellular communication protocols and standards for both voice calls and packet data transfer such as GSM, CDMA, GPRS, EDGE, UMTS, LTE, etc. Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may optionally include one or more ports or sockets for wired connections, e.g. USB, HDMI, FireWire (IEEE 1394), etc. or for receiving non-volatile memory cards, e.g. SD (Secure Digital) card, miniSD card or microSD card.

For voice calls, the mobile device 100 includes a microphone 180, a speaker 182 and/or an earphone jack. Optionally, the device may include a speech-recognition subsystem for transforming voice input in the form of sound waves into an electrical signal. The electrical signal is then processed by a speech-recognition module (digital signal processor) to determine voice commands from the voice input. Voice commands may be used to initiate a call and to select the call recipient from an address book.

Optionally, the mobile device 100 includes a positioning subsystem such as a Global Positioning System (GPS) receiver 190 (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

Optionally, the mobile device 100 may include a Wi-Fi™ transceiver 192, a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198.

The mobile device 100 thus uses its memory 120, 130 to store all place data for the mobile device in a centralized place data store for each of a plurality of places. The centralized place data store may be a single data store or may be a group of co-operative data stores, or any suitable arrangement of data stores. The centralized database or data store may be a unified, common, or shared database or data store. The processor 110 is operatively coupled to the memory 120, 130 to execute a plurality of applications. These applications may require positioning data, e.g. GPS coordinates. The processor determines when place data or more broadly place-related data is required for the applications and obtain all of the place data (or place-related data) required for all applications on the mobile device from the centralized place data store (consolidated place database) 200. In another implementation, the centralized place data store (or consolidated place database) may be situated at a server that is accessible by the mobile device.

For the purposes of this specification, place data (or place-related data) is data, e.g. computer-readable code that represents place-related information or place-related content that describes a place. The place-related content and information may be text, maps, photos, video, audio files, or other data. The place-related information and content is thus a multi-faceted description of the place. One element of this description is the location of the place, which may be characterized by location data, such as for example location coordinates, a street address, etc. Thus, the place data encompasses the location data. For the purposes of this specification, place data is meant to encompass not only the data itself but also any references or links to place data stored externally to the centralized place data store. In some embodiments, there may be restrictions inhibiting the physical storage of all place data in the centralized place data store with the rest of the place data. Examples of externally stored data may be any restricted, confidential, or proprietary data that may not be copied to the centralized data store. In these embodiments, only the references or links to the externally stored data are actually stored in the centralized place data store, not the data itself. Nonetheless, the centralized place data store remains the sole recipient of all place data requests from applications. In other words, all applications on the mobile device access only the one centralized place data repository for all required place data.

In one embodiment, the centralized place data store 200 comprises, for each place, a place tag identifying the place. The place is either a physical location or, in some embodiments, a virtual location. A physical location means a geographical location somewhere on earth. A virtual location may be a virtual location or an event that is a proxy for a location such as a meeting (Web conference), conference call, or some other proxy for location that has a location-implicit meaning to the user. In other words, although a virtual meeting may be physically performed at any computer, to the user this virtual meeting implies a place (e.g. his home computer or alternatively his work computer, depending on his own personal context, or the implied place may be within a perimeter or partition on the same device, for example a device having a work or personal perimeter). The physical location is defined by location coordinates, e.g. latitude and longitude coordinates which may be GPS-derived. A user-specified virtual location descriptor identifies the virtual location to the user and this virtual location may not have any physical coordinates associated with it.

Figure 2:
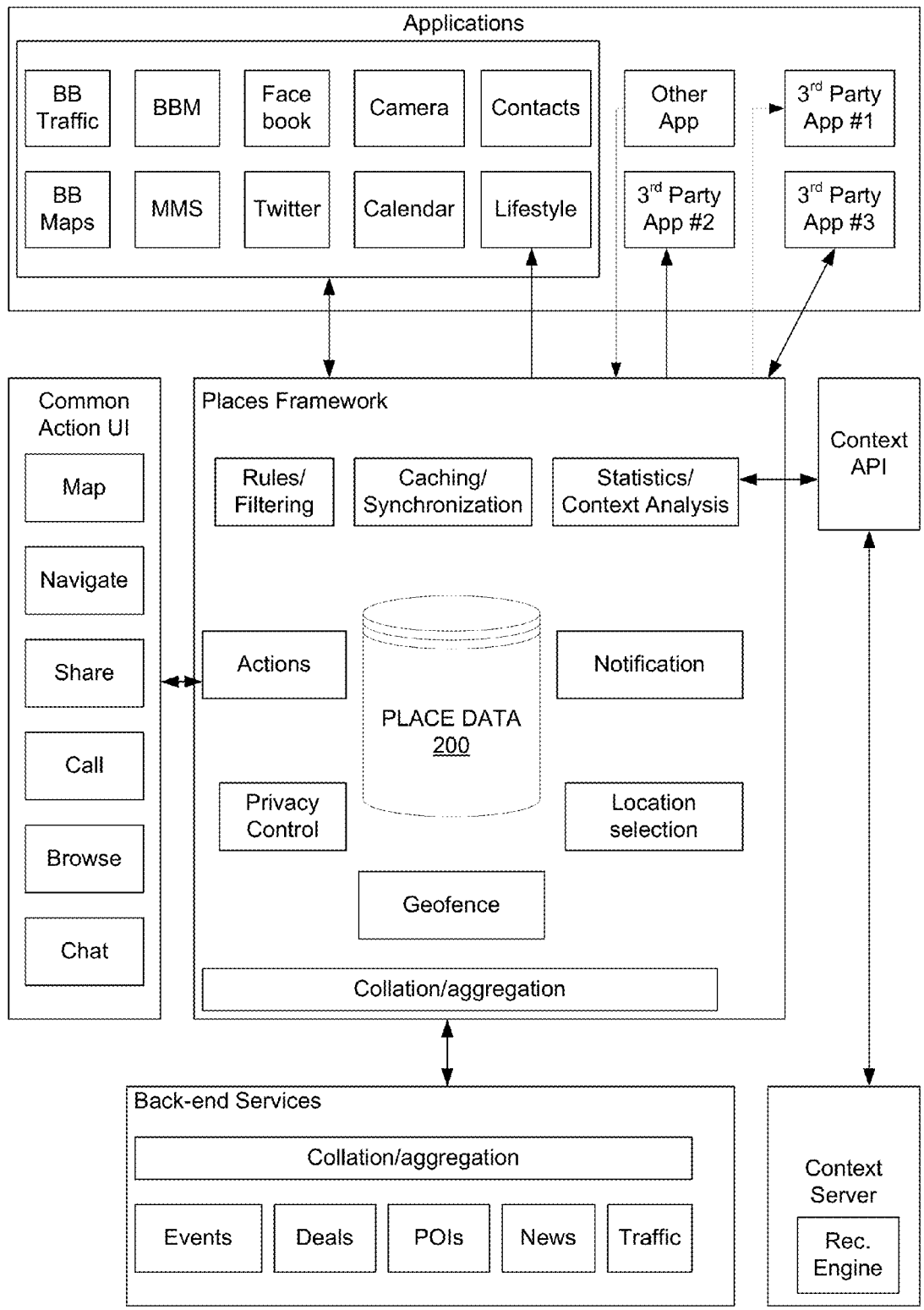
FIG. 2 is a functional block diagram of a place-data management system in accordance with one implementation of the present technology.

Conceptually, the centralized place data store 200 may be understood as being the core of a places framework such as the one depicted schematically in FIG. 2. The place-related data is not only centralized but this data includes semantic place data that provides a much richer level of place-related content that is conventionally provided. As shown by way of example in FIG. 2, a plurality of device applications (be it applications that are native to the device or third-party applications) interact with the place framework. Some apps may be place data contributors, some may be place data consumers, and some may be both consumers and contributors. This framework includes various modules, as shown, for rules/filtering, caching/syncing, statistics/context analysis, actions, privacy control, notification, location selection, geofencing, collation/aggregation. The actions module interacts with a common action UI that provides functionalities such as mapping, navigation, sharing, calling, browsing, chatting, etc. Therefore, for any location, any of these functions can be performed. In one embodiment, depending on the types of place content available for the place, the relevant actions will be associated with the data and thus can be visually presented to the user and acted upon. The place content type may thus limit the available functionalities/actions for a given place. For example, a share action may be possible for a virtual place whereas a map/navigate action would only be applicable to a physical place (i.e. a real-world location). Backend services, as shown in FIG. 2, may provide collation/aggregation of various content types such as events, deals, POIs, news, traffic incidents, etc. As further depicted by way of example in FIG. 2, the system may include a context API that interacts with a context server having a recommendation engine. This context server may be used to monitor usage patterns (user behaviour) at a given place to see what the user does at that place. Based on the activities and the data requests of the user at that place, the system can intelligently learn the user's personal preferences as they relate to that specific place. This contextual information may be used to supplement the place data in the centralized place data store 200.

Figure 3:
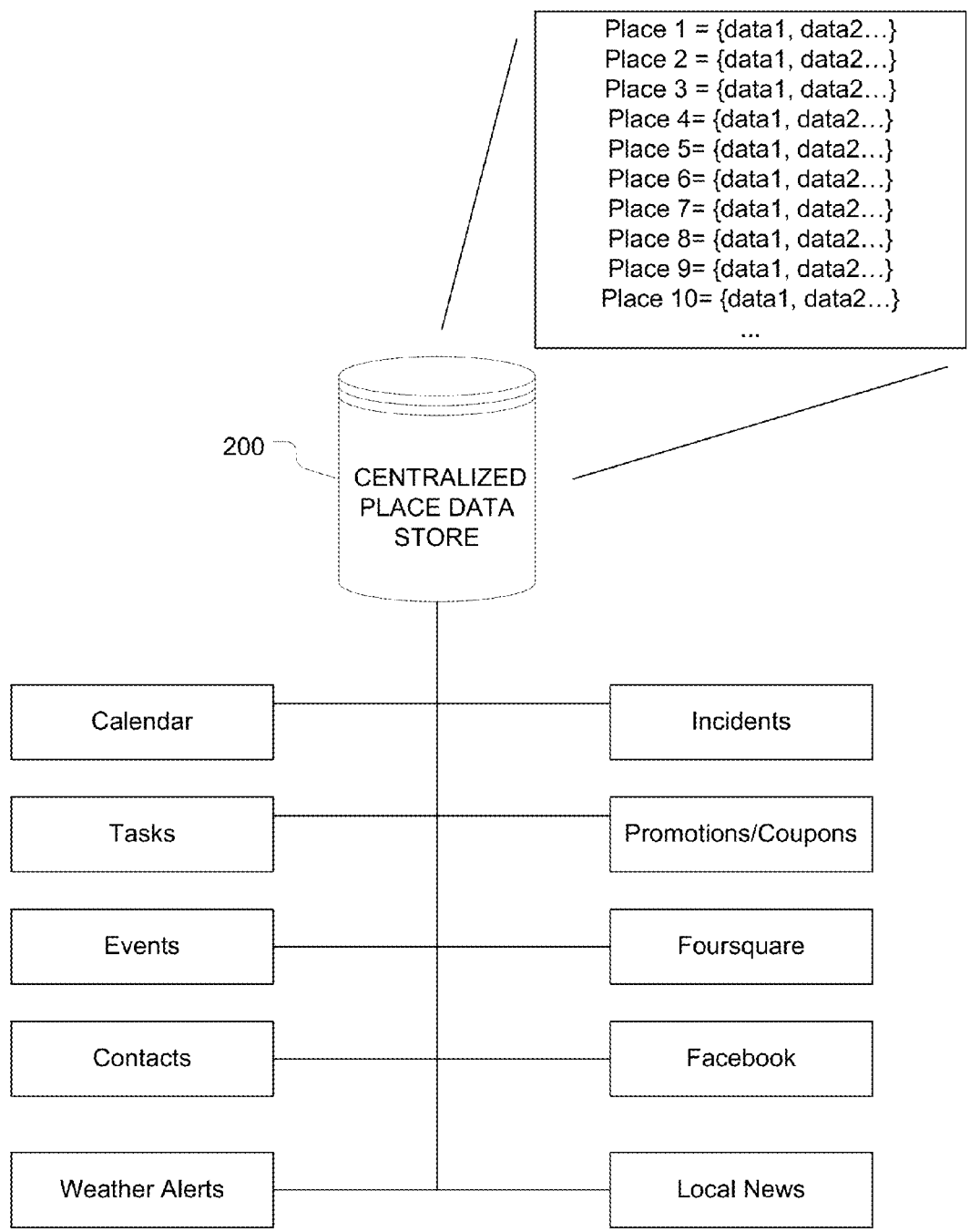
FIG. 3 is a schematic depiction of the centralized place data store for providing all location data to all applications executed by the mobile device.

As further illustrated by way of example in FIG. 3, the centralized place data store 200 stores all of the place-related data for a plurality of places. The places may be user-defined or externally defined places. As shown in FIG. 3, the store 200 stores a collection or list of places. Associated with each place is a set of place-related auxiliary data (or synonymously "place data" or "place-related data"). Place auxiliary data is either application-specific data or non-application specific data that describes the place. An example of application-specific auxiliary data are meeting attendees (Calendar app) associated at this given place. Examples of non-application specific auxiliary data are videos, documentary/blogs, statistical data, etc., associated with the place. The place-related auxiliary data can be physically stored in the central Places database or referenced in the Places database to their respective sources.

Each application (calendar, tasks, events, contacts, weather alerts, incidents, promotions, Foursquare, Facebook, local news, etc.) obtains all of its place-related data from the centralized place data store 200. This consolidated data store simplifies data updates, ensures consistency of data, and minimizes memory usage.

Figure 4:
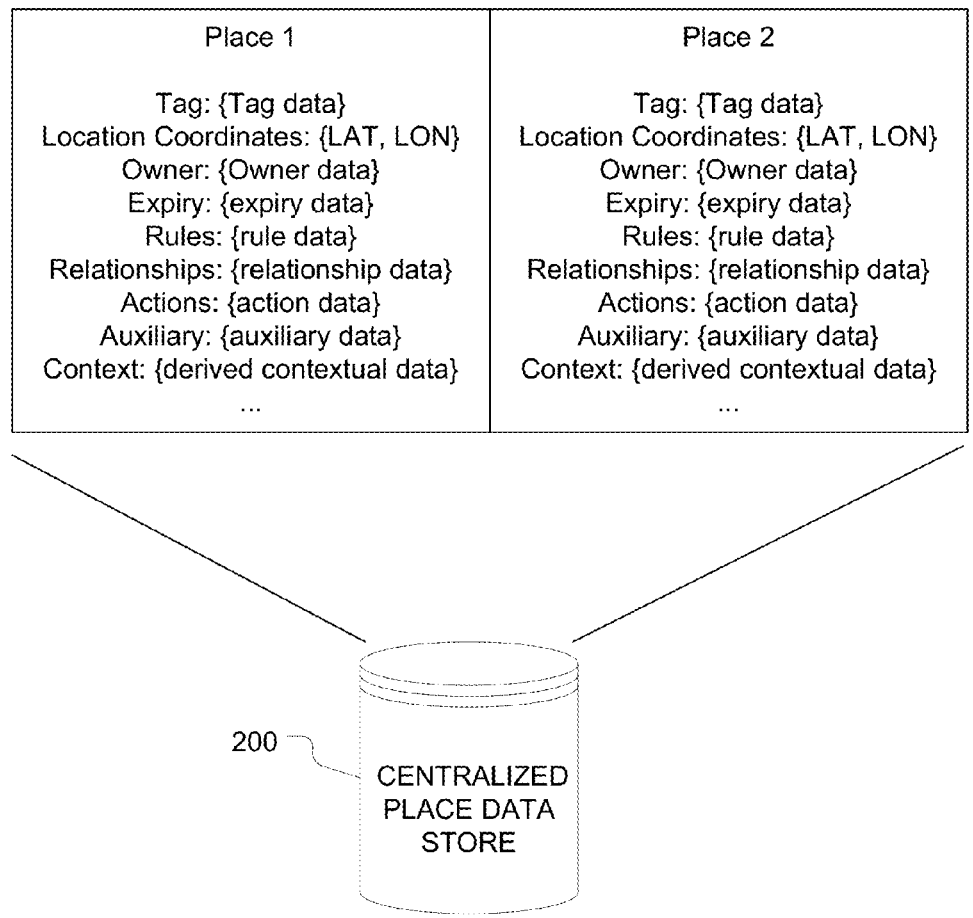
FIG. 4 is a schematic depiction of the various categories or types of place data that the centralized place data store maintains for each place.

FIG. 4 depicts schematically the various types or categories of place data that may be stored in the centralized place data store 200. For example, each place may be characterized by a tag (name) describing the place, location coordinates (latitude and longitude), its category, a description of the place, keywords related to the place, a start/end time (or an expiry time for the data), auxiliary data such as contacts related to the place, images or photos of the place, videos of the place, URLs to websites related to the place. In addition, as shown in FIG. 4, there may be categories such as available actions, rules governing how the place data is to be shared or not amongst the applications running on the device, or how this data is accessed, persisted or visually presented, relationships to contacts or other persons, events, or other places that are in some way related to the place, etc. Relationships may also include relationships between the place and another place or between the place and a plurality of other places. Relationships may also encompass relationships between a place and an event. The relationship between a place and people or events is described in the auxiliary data. As will be appreciated, the categories or types of data may vary. Not all of the types or categories of data for a given place will be specified. In some embodiments, only a subset of these categories is utilized.

For example, in one embodiment, the centralized place data store comprises, for each place, a data owner identifier that identifies an application that owns the data. In one embodiment, the centralized place data store comprises, for each place, a set of rules specifying how the data is to be shared, accessed, persisted or visually presented. In one embodiment, the centralized place data store comprises, for each place, a set of relationships identifying contacts related to the place. In one embodiment, the centralized place data store comprises, for each place, an expiry date specifying when the data will expire or need to be refreshed. In one embodiment, the centralized place data store comprises a set of actions to be performed which are relevant or applicable to the place. Any combination of these data characteristics or attributes may be utilized to characterize a place, i.e. to give the place its semantics.

As mentioned above, place data may also be inferred or learned by the mobile device in response to user behaviour or activities performed by the user using the mobile device when situated at a place or when requesting data about a place. Therefore, in one embodiment, the processor and memory cooperate to monitor usage of location data (or more broadly place data) by a user of a mobile device when located at a place, derive contextual information about the place and the personal preferences of the user with respect to the place, and integrate the contextual information as additional place-related data.

In another aspect of the technology, the mobile device may regulate how place data is delivered to the various applications on the mobile device. Therefore, in one embodiment, the processor and memory cooperate to register an application for proximity notification. The processor then determines if the mobile device is within a predetermined proximity of a place. In response to determining that the mobile device is within the predetermined proximity of the place, the processor provides a proximity notification to the application.

Figure 5:
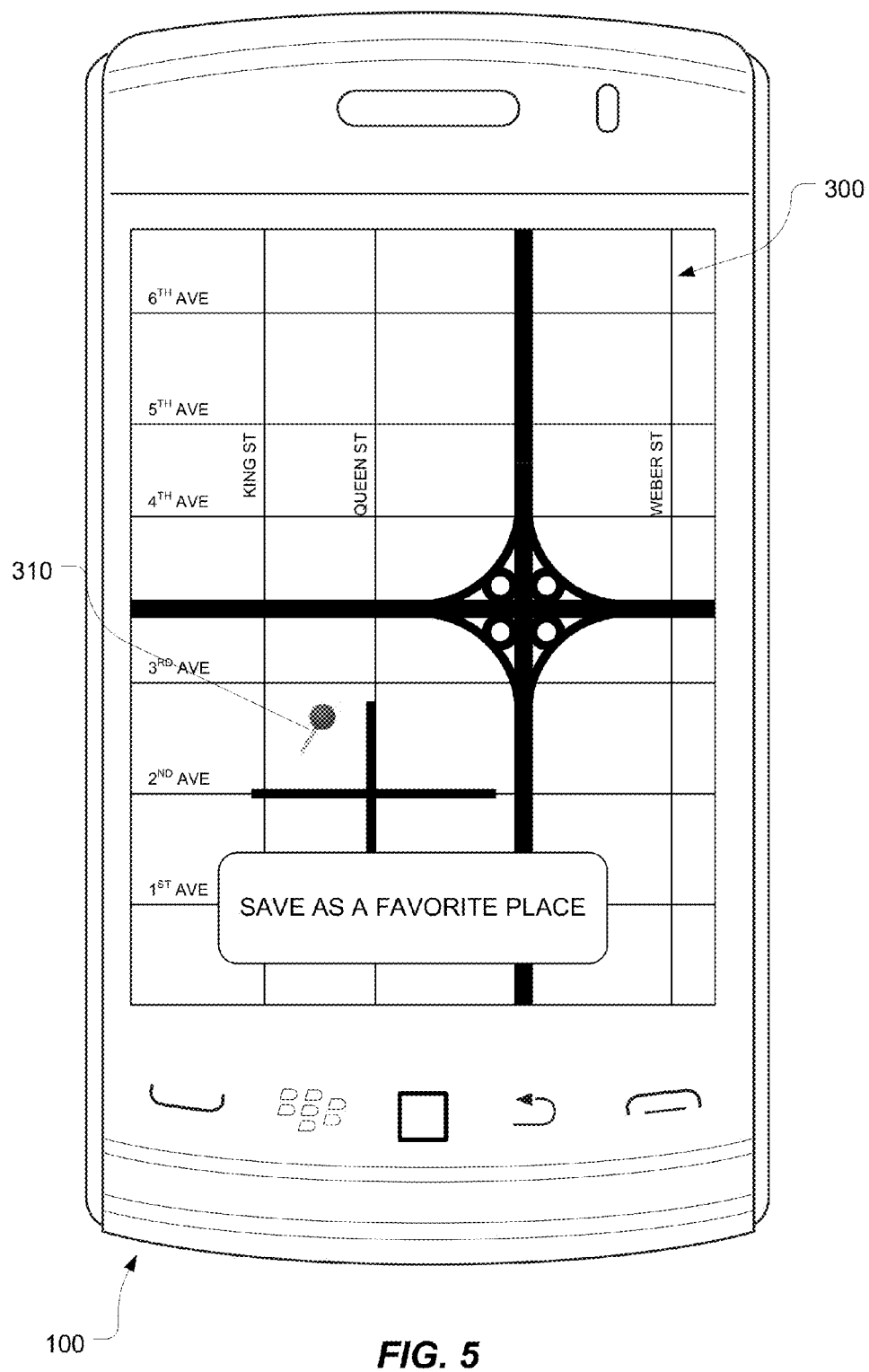
FIG. 5 is an example of a map displayed by a mapping application on a mobile device, showing a user interface element for setting a POI as a favourite place.

FIG. 5 is an example of a map displayed by a mapping application 300 on a mobile device, showing a user interface element for setting a POI 310 as a favourite place.

Figure 6:
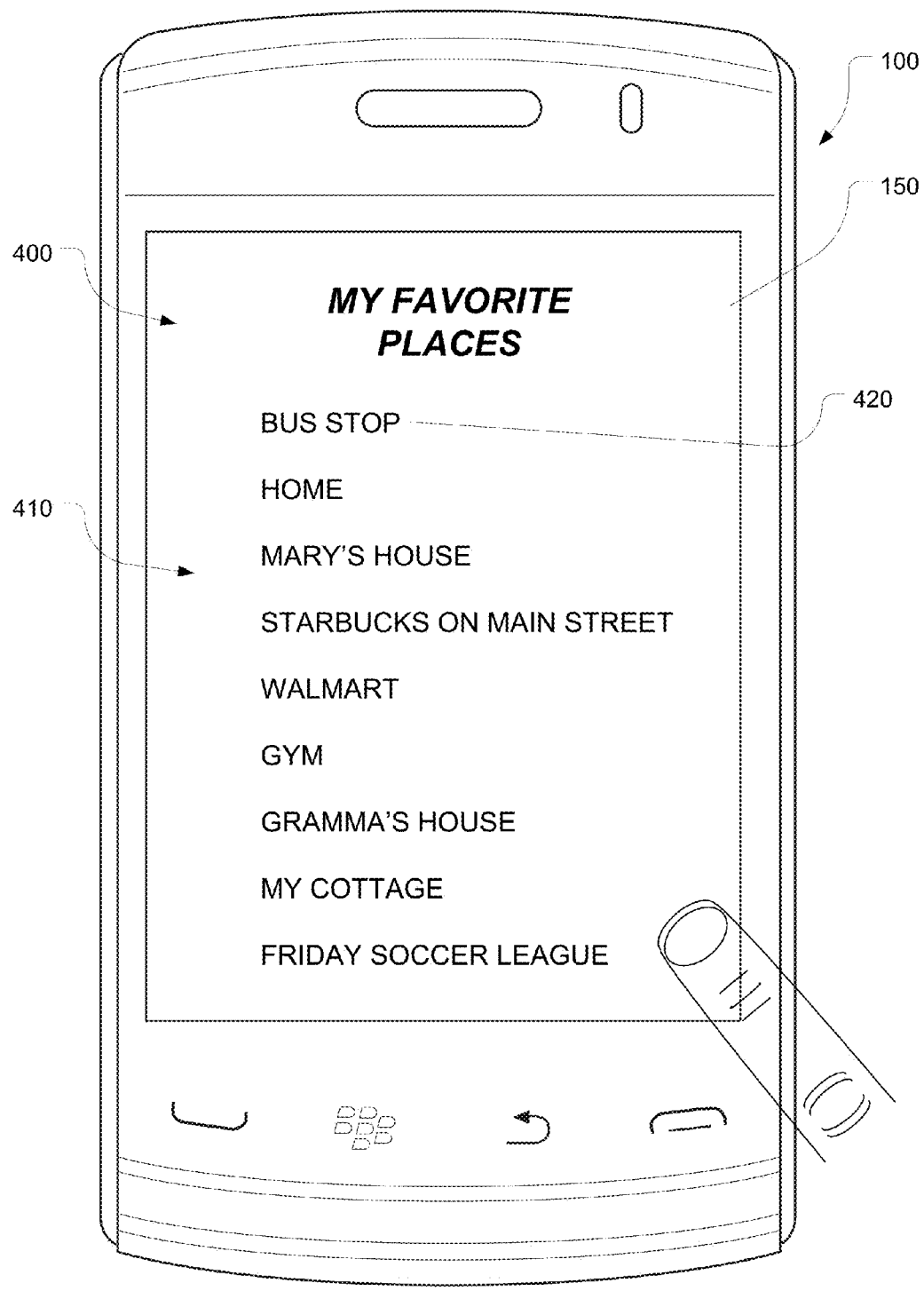
FIG. 6 is an example of a UI that presents favourite places.
Figure 7:
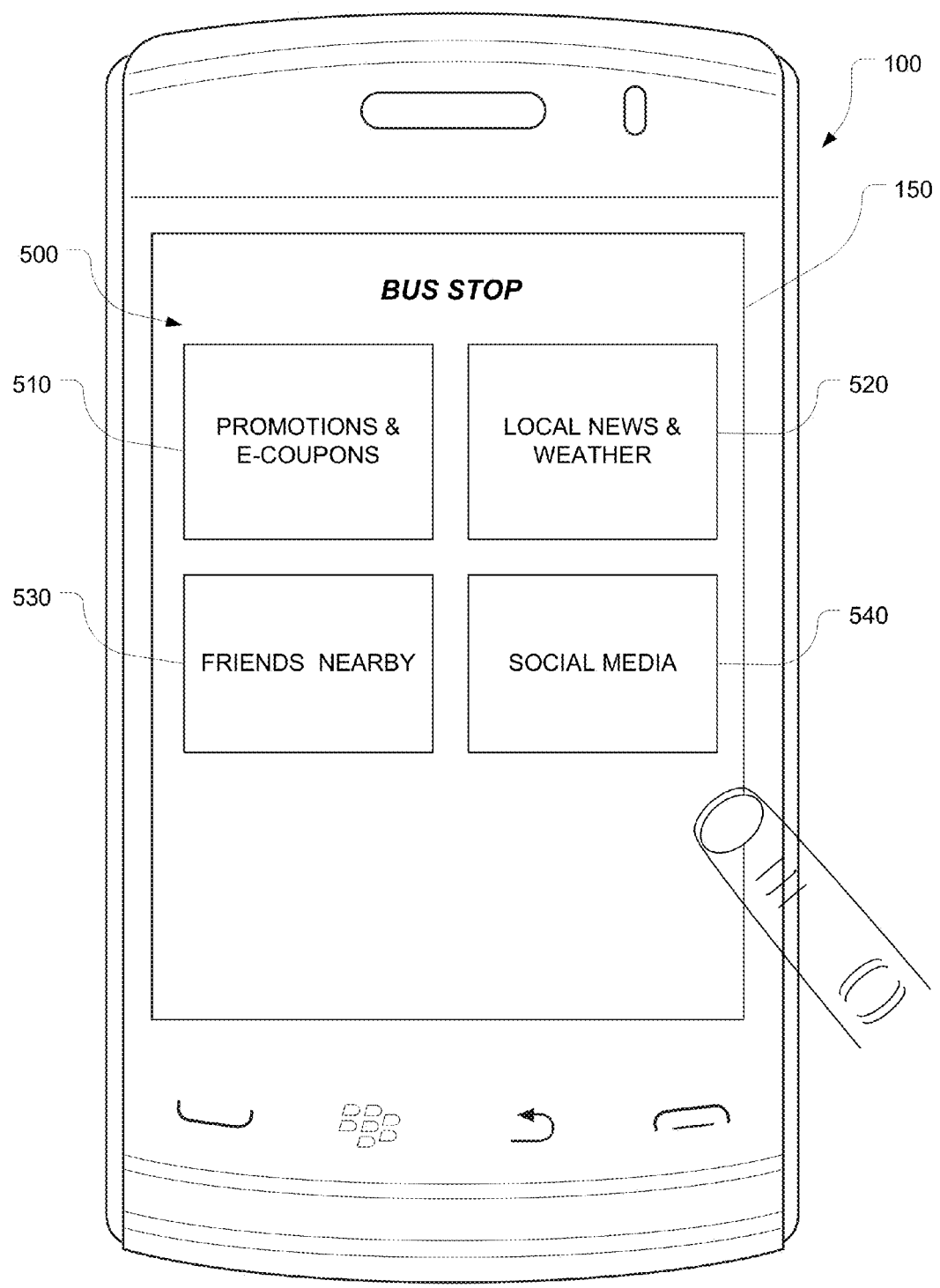
FIG. 7 is an example of a UI that presents place data for one selected place.
Figure 8:
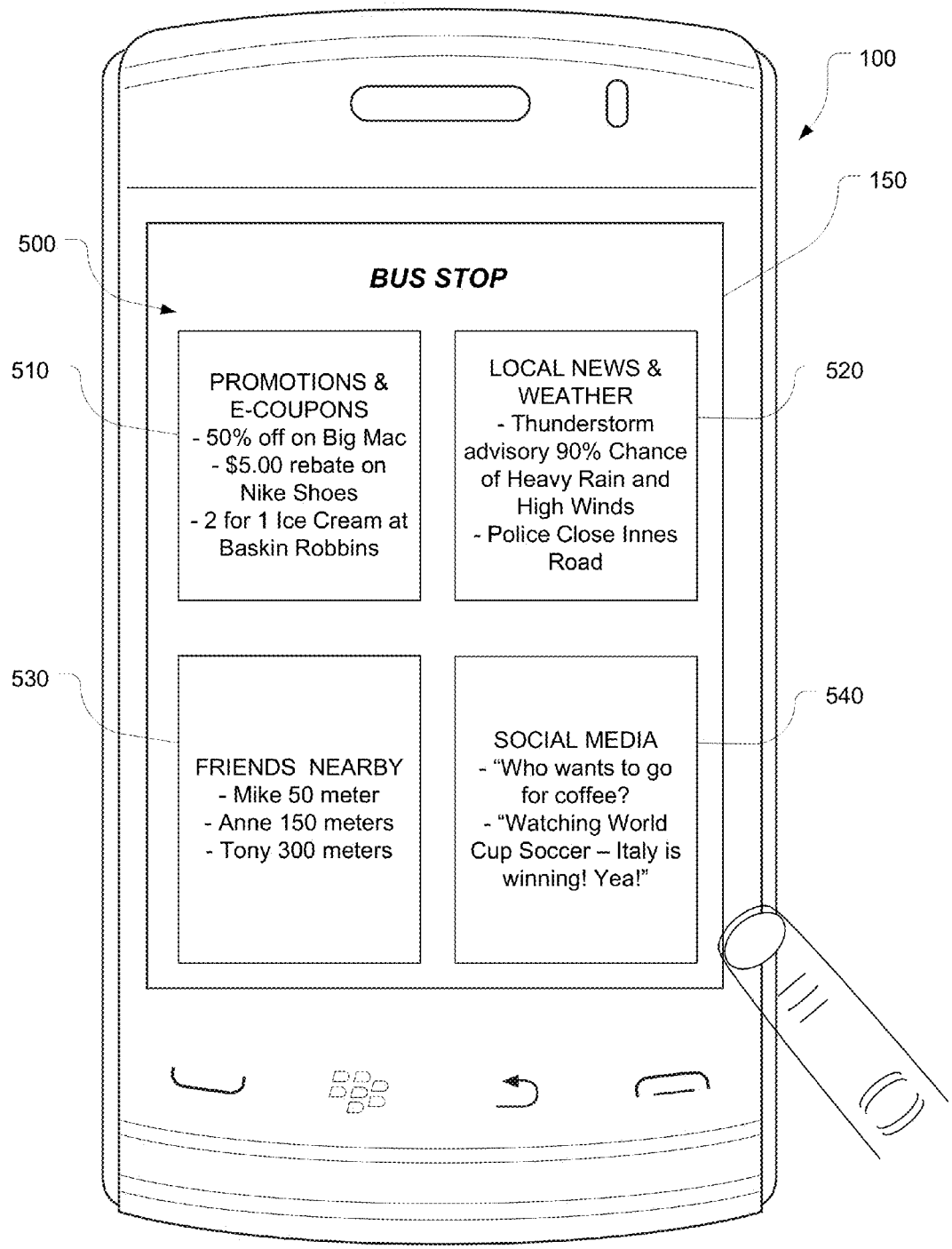
FIG. 8 is another example of a UI that presents place data for one selected place.

FIG. 6 is an example of a UI that displays favourite places ("My Favourite Places") on a display screen 150 of a mobile device 100. The favourite places UI 400 presents the favourite places as a favourite places list 410, although the favourite places may be displayed in any suitable format. In one embodiment, each listed place 420 is user-selectable (by touching or any other appropriate form of user input) to obtain more information about the listed place. For example, touching or selecting bus stop will cause the device 100 to display a place view for the bus stop. The place view may present place-related information (i.e. auxiliary data related to the place) as shown in FIG. 7 or, alternatively, FIG. 8. In the example of FIG. 7, the place view 500 displayed on the display 150 of the mobile device 100 comprises a plurality of user-selectable categories of place-related data, e.g. promotions & e-coupons 510, local news & weather 520, nearby friends 530 and social media 540. These are solely by way of example, and other categories, layouts or labels may be used. The user may select any one of the categories 510-540 by touching the user interface elements. Alternatively, as shown in FIG. 8, the UI may display all or a subset of the available and most recent place data based on time received, relevancy, or any other prioritization scheme. The UI in FIG. 8 shows the promotions and e-coupons that are relevant for the place (i.e. for the Bus Stop), the local news and weather for the bus stop, which friends are near the bus stop, and any social media feeds that may have some relevancy to the area surrounding the bus stop. The place view thus consolidates and presents all place-related content to the user when the user selects the place. Note that selecting a place may be done without the user physically traveling to the place although in one embodiment the place may be set to correspond to the current location of the mobile device. For each UI shown in FIGS. 6-8, there may be applicable actions displayed as will be illustrated, for example, in FIG. 11*c*). The actions may include, for example, map, go, browse, call, etc. for the selected place.

Figure 9:
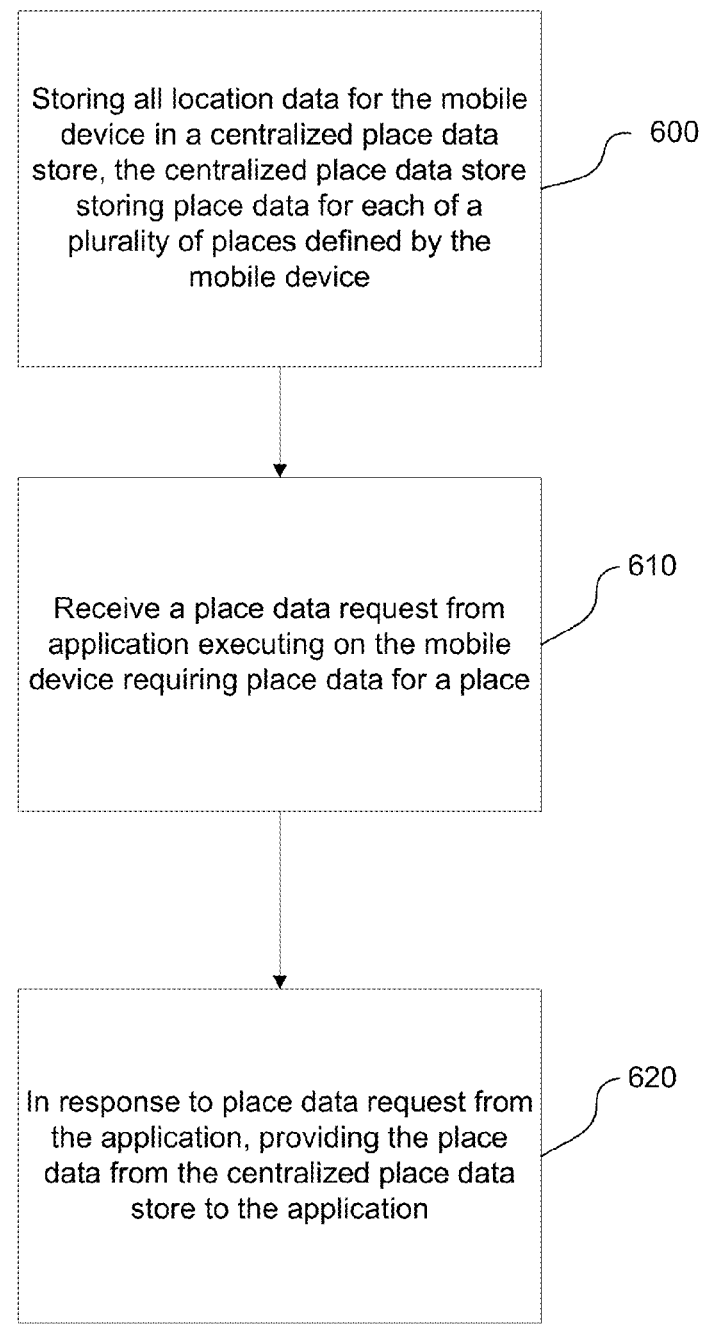
FIG. 9 is a flowchart depicting steps of a method in accordance with one implementation of the present technology.

The foregoing technology also provides a novel method of managing place data for a mobile device. As outlined by the flowchart depicted in FIG. 9, the method comprises a step 600 of storing place data for the mobile device in a centralized place data store. In some embodiments, all place data is stored in the data store whereas in other embodiments, not all of the place data is stored in the data store. The centralized place data store stores place data for each of a plurality of places. At step 610, a place data request is received from an application executing on the mobile device. The application requires place data for a place. At step 620, in response to the place data request from the application executing on the mobile device, the device provides the place data from the centralized place data store to the requesting application. Centralizing all place data in a central place repository enables place data to be viewed, updated or added by one application to be accessible to all other applications that have the permission to view that place data. The centralized database makes data sharable among apps on the device, improves security/privacy by implementing configurable data-sharing rules, ensures consistency in how data is presented and used, optimizes memory usage as data is no longer duplicated for each app, and is extensible via pluggable data sources as new place content sources can be connected. In some embodiments, the place data requests do not need to be received concurrently or simultaneously, and furthermore the applications executing on the device also do not need to be executing concurrently or simultaneously.

FIGS. 10*a*-17*c* present various user interfaces that may be used on a mobile device in relation to the foregoing technology. These are presented solely to further illustrate the inventive concepts and should not be interpreted as limiting the invention or as representing the only UIs that may implement this novel place-data-centric paradigm. Other UIs with other layouts, configurations, and labels may be employed to implement this novel technology.

Figure 10D:
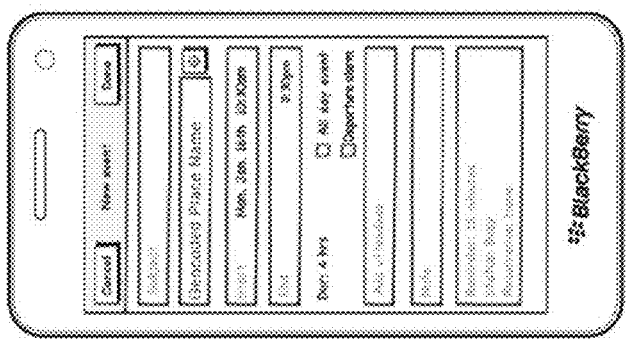
FIGS. 10a-10d depict mobile device user interfaces for creating new data for a place.
Figure 10C:
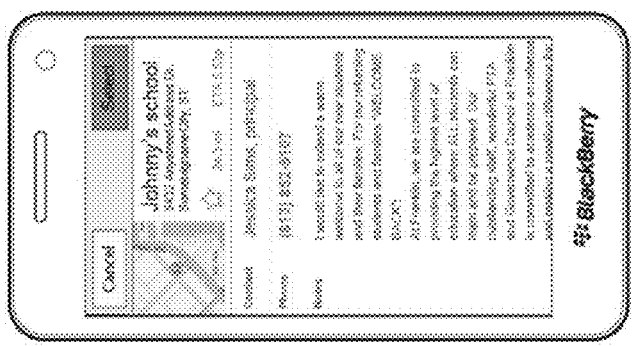
Figure 10B:
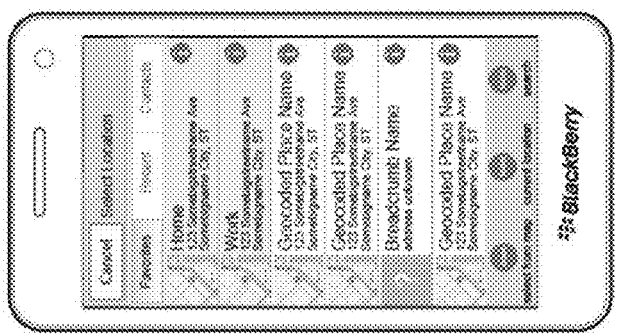
Figure 10A:
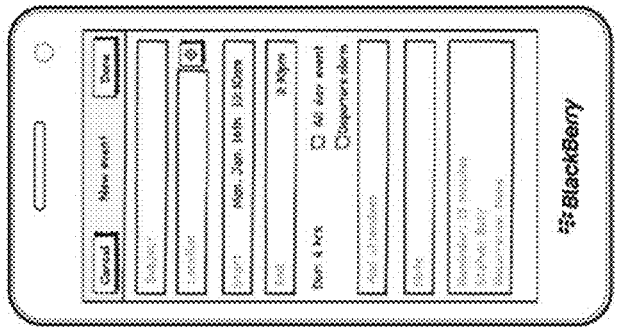

FIGS. 10*a*-10*d* depict mobile device user interfaces for creating new data for a place. FIG. 10*a* shows a UI for creating a new event. Exemplary fields include subject, location, start time, end time, attendees, notes, reminder, status, recurrence, etc. Similarly, FIG. 10*d* shows the UI in which the location field of the meeting event is now populated with the place selected by the user via the UIs depicted in FIGS. 10*b* and 10*c*.

FIG. 10*b* shows a UI that displays a list of places or locations. The device may provide a favourites list, a recent list, and a contacts list, as shown. User interface elements may be provided to select a location from a map, to use the current location of the device or to search. FIG. 10*c* depicts a UI that displays a place ("Johnny's school"), its address, distance, driving time (ETA), contact information (the principal's name), phone number, and notes relating to the place (i.e. relating to the school).

Figure 11C:
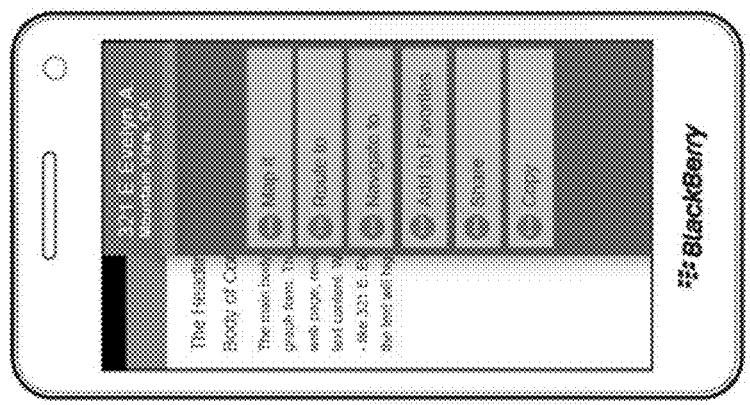
FIGS. 11a-11c depict mobile device user interfaces for displaying a menu of action options for performing various actions in relation to a place.
Figure 11B:
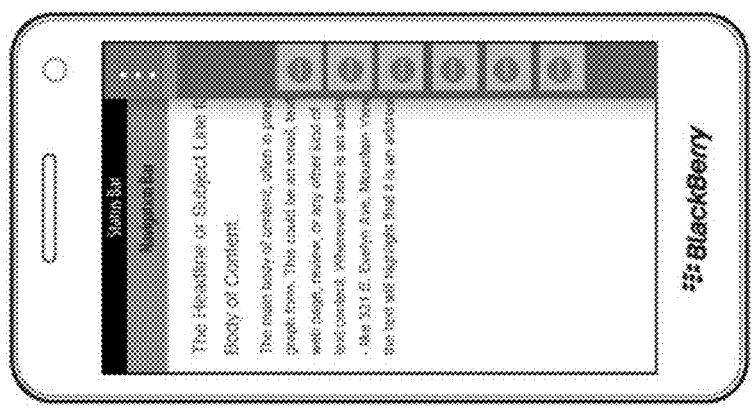
Figure 11A:
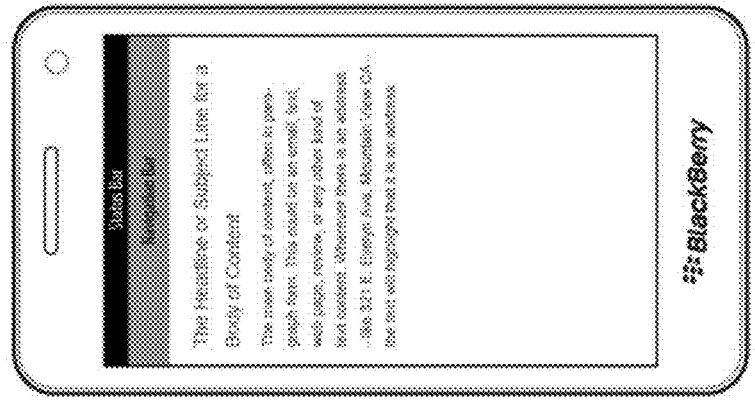

FIGS. 11*a*-11*c* depict mobile device user interfaces for displaying a menu of action options for performing various actions in relation to a recognized place in the text field. Specifically, FIG. 11*a* shows a UI displaying a corpus of textual content from which an address is identified. Identification of the address may be done by parsing the text. The address may be hyperlinked or otherwise highlighted. A menu may slide out from the right side of the UI, as shown in FIG. 11*b* to provide menu items (actions) that may be performed in relation to the location (address). For example, the menu items may include actions such as map it, route to, navigate to, add to favourites, share, copy, etc. The add to favourites action adds the place the Places repository.

Figure 12C:
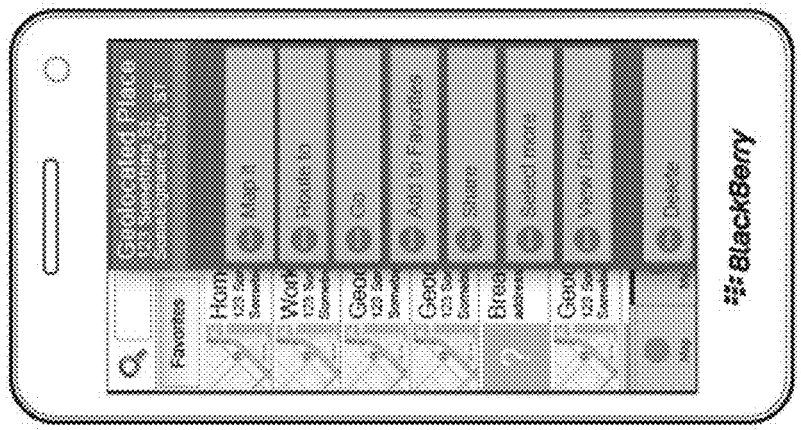
FIG. 12c depicts a menu of action options for performing various actions in relation to a geolocated place.
Figure 12B:
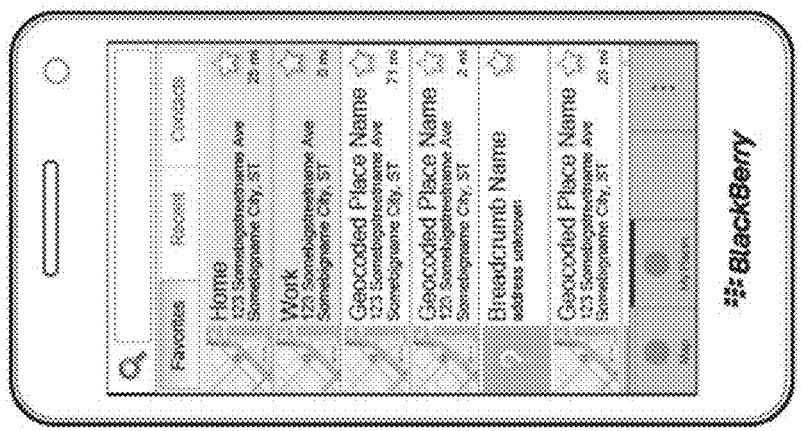
FIGS. 12a-12b depict mobile device user interfaces that enable toggling between a map and a list of favourite places ("My Places")
Figure 12A:
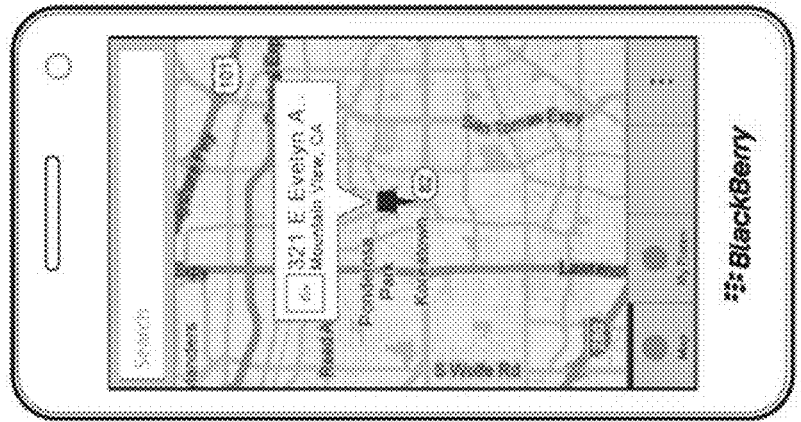

FIGS. 12*a*-12*b* depict mobile device user interfaces that enable toggling between a map and a list of favourite places ("My Places"). Specifically, in FIG. 12*a*, a map is displayed on a mobile device to show, in this example, a pushpin icon representing a specific address. The address is displayed in this example in a text bubble or callout that points to, or is otherwise associated with, the pushpin icon. The UI may comprise a map button and a My Places button (e.g. at the bottom of the screen, below the map, as shown by way of example in FIG. 12a). These buttons may be touched or selected to toggle between a map view and a places view such as the one shown by way of example in FIG. 12b. The user may then touch or select any one of these places. In response to touching a place, an action menu is then displayed as shown in FIG. 12c. This menu of action options enables the user to perform various actions in relation to a place such as map it, route to, go, add to favourites, share, select more, view details, delete, etc.

Figure 13D:
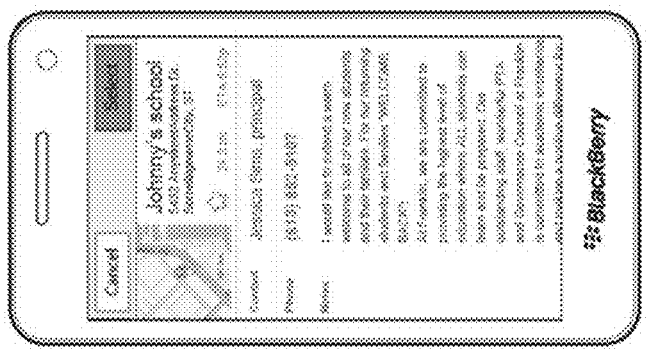
FIGS. 13a-13d depict various place-related user interfaces.
Figure 13C:
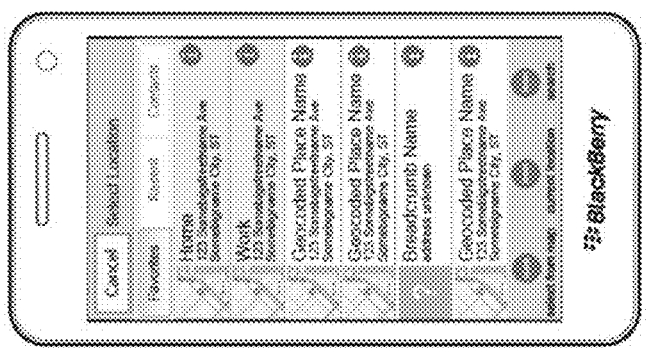
Figure 13B:
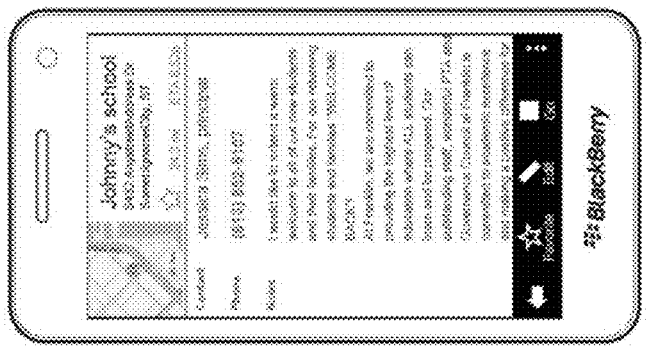
Figure 13A:
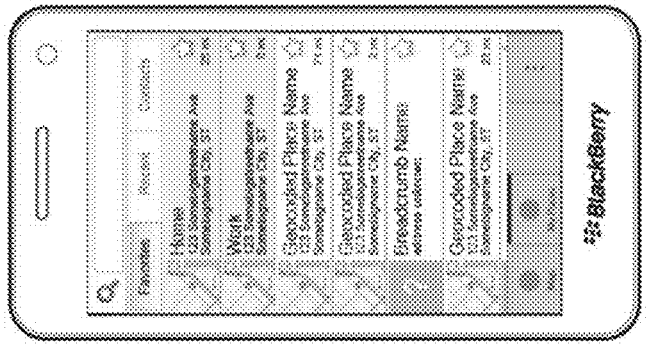

FIGS. 13a-13d depict various place-related user interfaces as further examples. These figures illustrate the concept of providing place details for a selected place. For example, from the UI of FIG. 13a, the user may select one of the listed places to obtain place details such as shown in FIG. 13b. Likewise, the user may select a place displayed on the UI of FIG. 13c to obtain place details as shown in FIG. 13d.

Another set of examples (FIGS. 14-17c) illustrate how place-related location data may be exploited to provide new device functionalities and features that were hitherto not possible with pre-existing technologies. In these figures, a place is defined in terms of a predetermined proximity to a location, in this example a user-specified address (e.g. "Near 474 March Rd"). The device may be configurable to specify a distance threshold, spatial tolerance or radius that defines "near", e.g. within 50 meters, 100 meters, 250 meters, 1 km, 10 km, etc. In other embodiments, the device may provide a tiered approach, defining "at" to be within 10 meters, "near" to be within 100 meters, and "in the same general vicinity" to be within 1 km, for example. These examples illustrate how a given application executing on the mobile device or even multiple applications acting in concert or executing in parallel, may retrieve or obtain from the centralized place data store whatever place-related data is available for the place selected by the user or otherwise identified as the desired place by the mobile device. In each instance, the device may use this place-related data to provide location-based services (LBS) or may display the place-related data to the user in any number of ways, some of which are presented below.

Figures 14A, 14B, 14C:
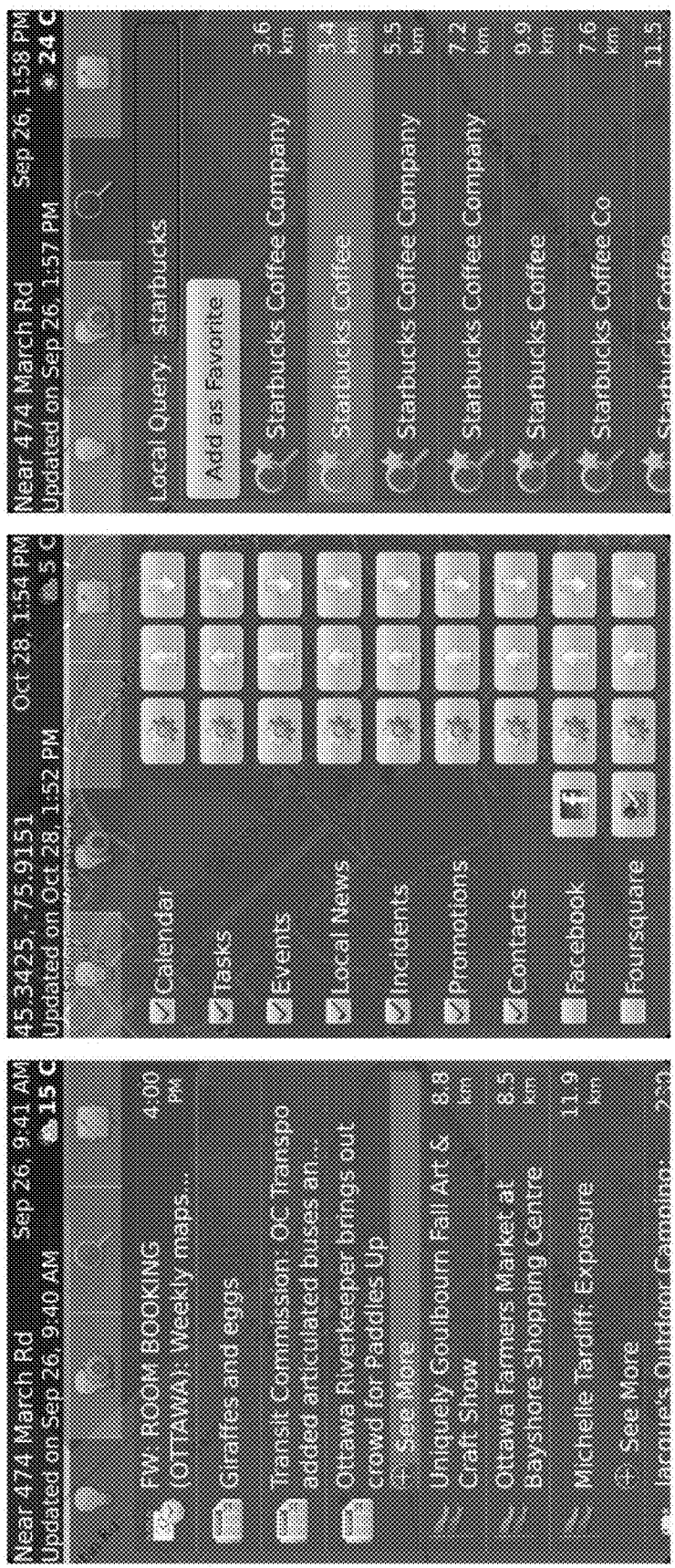
FIG. 14a depicts a place view UI that lists all content related to the place.
FIG. 14b depicts a UI that enables the user to control which types of content is to be presented.
FIG. 14c depicts a local query UI with a UI element for adding one of the search results as a favourite place.

FIG. 14a depicts a place view UI that lists all content related to the place. This UI is an example of how a place view may present place-related information to the user of various types (i.e. for various applications). For example, as shown in FIG. 14a, the place view presents a calendar entry, local news, local events/POIs. This UI thus provides a consolidated (overview) display of all place-related content where the displayed items of content are associated with a plurality of different applications. FIG. 14b depicts a UI that enables the user to control which types of content is to be presented on this consolidated (overview) display. Other functionalities may be provided on these UIs. For example, near the top of each screen are user interface elements that provide functionalities such as view list, configure which applications to show, search and view map. For example, touching the search button will cause the UI to switch to a search screen such as the one depicted in FIG. 14c. As shown in FIG. 14c, the local query may be entered. Search results are displayed along with distance information. A UI element is provided for adding one of the search results as a favourite place.

Figure 15B:
FIG. 15b depicts a map showing a POI augmented with location-based advertising.
Figure 15A:
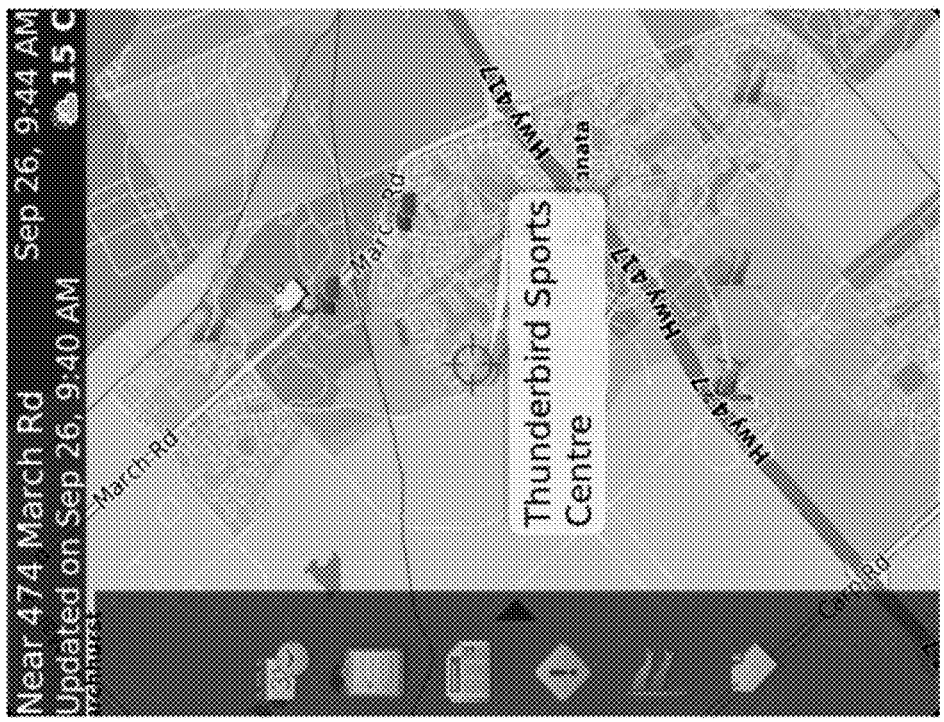
FIG. 15a depicts a map showing a POI that is near a place.

FIGS. 15a and 15b show how points of interest (POIs) may be displayed near the place selected by the user or otherwise identified by the mobile device. The POI may be filtered by user preferences, which may have been set explicitly by the user or which may have been learned by monitoring usage patterns of the mobile device at this or other places. FIG. 15a depicts a map showing a POI that is "near 474 March Rd". In FIG. 15a, the POI ("Thunderbird Sports Centre") may be of interest to the user because of some prior relationship with that POI (visited there, placed a phone call there, e-mailed there, visited their website, searched for sports centres, etc.)

FIG. 15b depicts a map showing a POI augmented with location-based advertising "First Bank: Check out the savings!". The location-based advertising (LBA) may be filtered based on user settings and/or based on usage patterns. For example, the mobile device may recognize that the user has recently searched for banks, or has visited this bank in recent months, done online banking with that bank, or has a friend or contact that works there, etc.

Figures 16A, 16B, 16C:
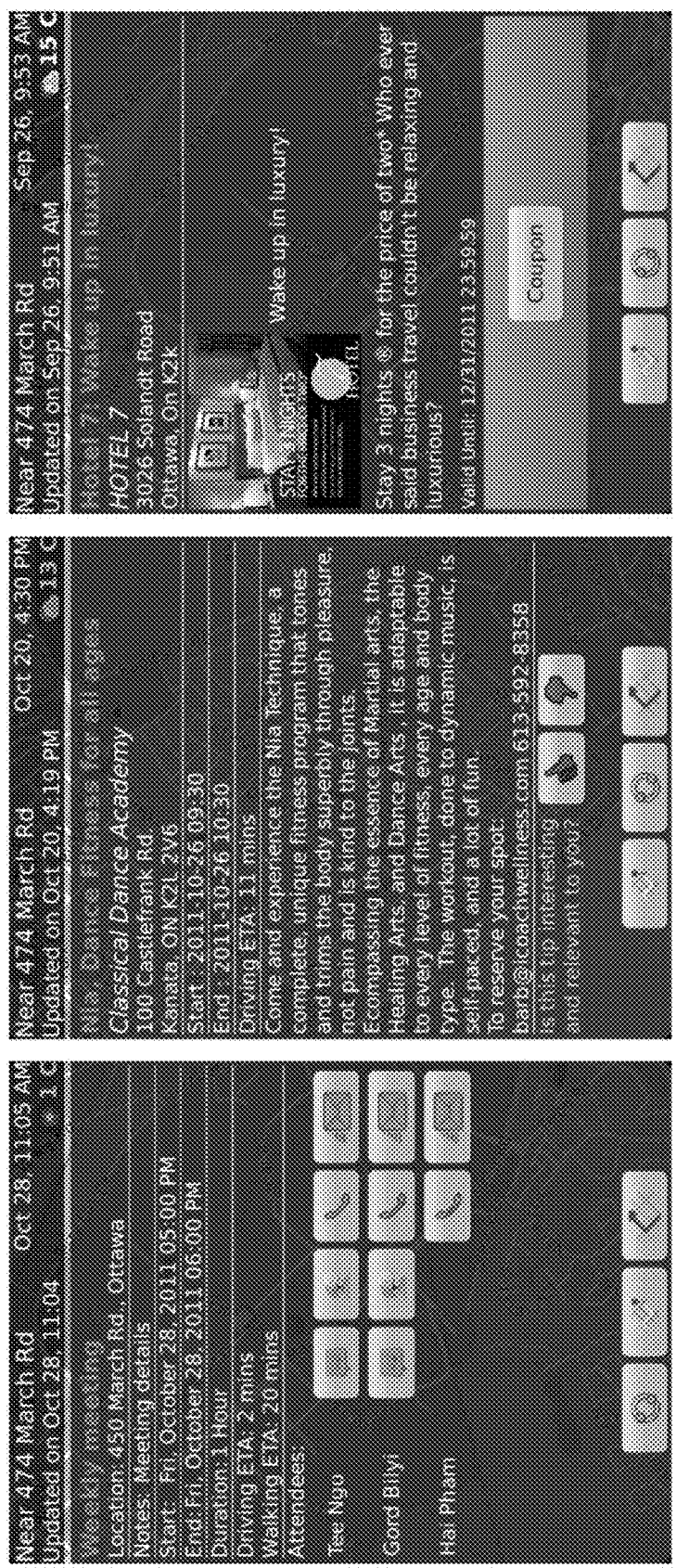
FIG. 16a depicts a place view for a weekly meeting.
FIG. 16b depicts one example of a place view for a commercial establishment.
FIG. 16c depicts another example of a place view for a commercial establishment.

FIGS. 16a-16c depict further UI examples of how place-related content may be delivered and presented to the user of the mobile device.

FIG. 16a depicts a place view for a weekly meeting as one example of a calendar event. This calendar event may be stored in the calendar application data store but the location data and any other place-related information about the place where the meeting occurs every week is stored in the centralized place data store. This UI may be accessed by opening or viewing the weekly meeting entry in the calendar application which then queries the centralized place data store to obtain the place data for this place and any place-related information that may be relevant to the user for that place. Alternatively, the user may access this calendar entry via the places view by navigating to the place in question (e.g. using My Places) and then clicking on the calendar event that is listed for that place. In FIG. 16a, the UI presents an indication of the address of the place (e.g. "near 474 March Rd"), the current date and time, current weather conditions, and an indication of when the place data was most recently updated. The UI also specifies the event location, start and end times, the driving and walking times (ETA) from the current location to the meeting or event location. Also noteworthy are the list of attendees who are scheduled to attend the meeting, as well as a plurality of user-selectable icons or interface elements that enable the user to communicate or otherwise interact with any one of the attendees. The attendees are examples of relationships (mentioned above) for the place. Other examples of relationships may be a pool of tennis players with whom a user habitually plays at a tennis club. When the user accesses the place view for the tennis club, these contacts may be displayed.

FIG. 16b depicts another example of a tip or suggested event that is suggested by the device to the user based on contextual information gleaned by the device about the user's habit and behaviour at that place. In this case, the device learns that the user enjoys attending dance classes at a nearby dance academy. The device then suggests to the user that she consider attending an upcoming dance class at the dance academy. This suggestion or tip enhances the user experience by informing the user of events, activities, offers, promotions, opportunities, etc. that are local or proximate to one of the user's places.

In addition to the address, start and end times, and driving time, the tip UI may present a description of the event or appointment, contact information (e-mail and phone) for reserving a spot at the dance class. The UI may present tip feedback icons (thumbs-up and thumbs-down icon, or yes/no, or a rating scale). Soliciting and obtaining this direct feedback from the user is another way of learning usage patterns, interests and preferences of the user. Future tips can be refined based on whether the user found the tip, suggestion or offer interesting. These tips may be generated by the mobile device or they may originate as LBA, which the device can filter or even modify (e.g. reformatting content) for the device.

FIG. 16c depicts an example of LBA that is offered to the user of the mobile device. In this example, the UI displays the ad or promotional offer onscreen. The offer, in this particular example, contains an e-coupon. A user interface element ("Coupon") may be displayed onscreen to permit the user to download the e-coupon.

Figure 17C:
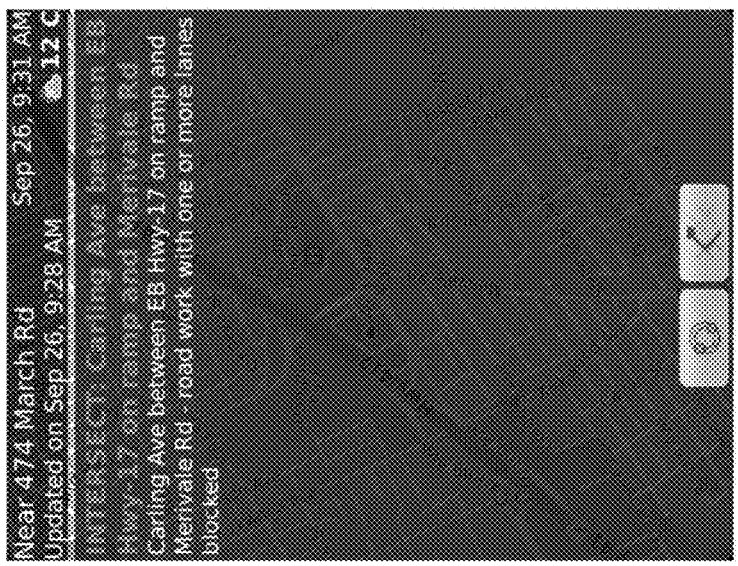
FIG. 17c depicts a place view for an intersection, showing a traffic update.
Figure 17B:
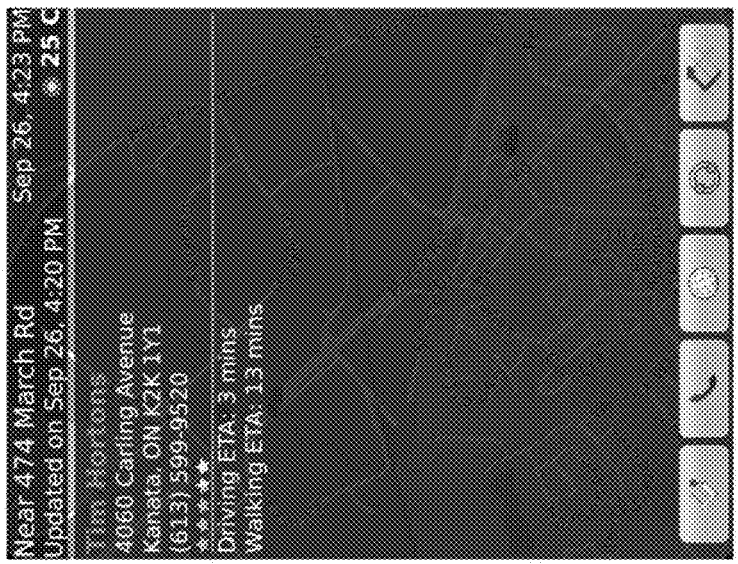
FIG. 17b depicts a place view for a coffee shop.
Figure 17A:
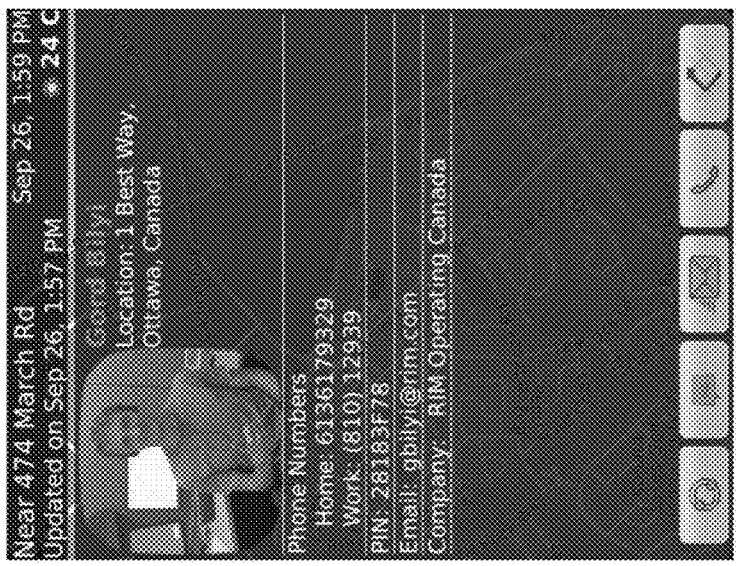
FIG. 17a depicts a place view for a contact.

FIGS. 17a-17c depict various further example place views where the place is again defined in terms of a predetermined proximity to the same specified address (e.g. "Near 474 March Rd"). Once the place and its distance threshold has been set, as described above, the application (contacts) may request any contacts that are at this place (i.e. at or near 474 March Rd). By applying this filter, the contact Gord Bilyi is provided from the centralized place data store to the contacts application which can then display the contact for the user. Various user interface elements may be provided to interact with the contact, e.g. send mail, call, navigate to the contact's location, etc. As further depicted by way of example, the UI may also display an update time indicating when the data was last updated (e.g. "Updated on September 26, 1:57 PM").

In FIG. 17b, the place has been used to obtain information about a local coffee shop ("Tim Hortons") that is near 474 March Rd, e.g. via a local search or local query filtered using the location of the place. The address, phone number, rating, driving time, walking time are displayed in this example, along with the update time indicating when the data was last updated.

As another example, FIG. 17c depicts a place view that presents an intersection near 474 March Rd for the purposes of providing a traffic update. When launching a traffic application using the place "near 474 March Rd", the device identifies an intersection where there is a traffic alert, construction or road condition update.

In addition to the contacts, local search and traffic examples presented in FIG. 17a-17c, many other applications may require place data such as, but not limited to, a calendar, e-mail, instant messaging (e.g. BBM), MMS, navigation, travel, maps, and various social network applications, etc.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method of managing place data for a mobile device, the method comprising:
    storing place data for place-related content for a plurality of places for all applications of the mobile device in a single centralized place data store on the mobile device, the single centralized place data store receiving all place data requests from the applications on the mobile device; and
    in response to the place data requests from one or more of the applications on the mobile device, providing the place data from the single centralized place data store to the one or more applications requesting the place data wherein the place data includes an expiry date specifying when the place data will expire.

2. The method as claimed in claim 1 wherein providing the single centralized place data store comprises storing, for each place:
    a place tag identifying the place, wherein the place includes either a physical location or a virtual location; and
    location coordinates for the physical location or a user-specified virtual location descriptor that identifies the virtual location to the user.

3. The method as claimed in claim 2 wherein providing the single centralized place data store comprises storing, for each place:
    a data owner identifier that identifies an application that owns the data.

4. The method as claimed in claim 2 wherein providing the single centralized place data store comprises storing, for each place:
    a set of rules specifying how the data is to be shared.

5. The method as claimed in claim 2 wherein providing the single centralized place data store comprises storing, for each place:
    a set of relationships identifying contacts related to the place.

6. The method as claimed in claim 2 wherein the centralized place data store further comprises one or more of:
    a data owner identifier that identifies an application that owns the data;
    a set of rules specifying how the data is to be shared;
    a set of actions to be performed at the place; and
    a set of relationships identifying contacts related to the place.

7. The method as claimed in claim 1 further comprising:
    monitoring usage of location data by a user of a mobile device when located at a place;
    deriving contextual information about the place and the personal preferences of the user with respect to the place; and
    integrating the contextual information as additional place-related data.

8. The method as claimed in claim 1 further comprising:
registering an application for proximity notification;
determining if the mobile device is within a predetermined proximity of a place;
in response to determining that the mobile device is within the predetermined proximity of the place, providing a proximity notification to the application.

9. A non-transitory computer-readable medium comprising instructions in code which when loaded into a memory and executed by a processor of a mobile device cause the mobile device to:
store place data for place-related content for a plurality of places for all applications of the mobile device in a single centralized place data store on the mobile device, the single centralized place data store receiving all place data from the applications on the mobile device wherein the place data includes an expiry date specifying when the place data will expire; and
in response to the place data requests from one or more of the applications on the mobile device, provide the place data from the single centralized place data store to the one or more applications requesting the place data.

10. The computer-readable medium as claimed in claim 9 comprising code to store for each place:
a place tag identifying the place, wherein the place includes either a physical location or a virtual location; and
location coordinates for the physical location or a user-specified virtual location descriptor that identifies the virtual location to the user.

11. The computer-readable medium as claimed in claim 10 comprising code for storing, for each place:
a data owner identifier that identifies an application that owns the data; and
a set of rules specifying how the data is to be shared.

12. The computer-readable medium as claimed in claim 11 comprising code for storing, for each place:
a set of relationships identifying contacts related to the place.

13. The computer-readable medium as claimed in claim 9 comprising code for:
monitoring usage of location data by a user of a mobile device when located at a place;
deriving contextual information about the place and the personal preferences of the user with respect to the place; and
integrating the contextual information as additional place-related data.

14. A mobile device comprising:
a position-determining subsystem for determining a position of the mobile device;
a memory for storing place data for place-related content for a plurality of places for all applications of the mobile device in a single centralized place data store on the mobile device, wherein all place data requests from the applications on the mobile device are received by the single centralized place data store, wherein the place data includes an expiry date specifying when the place data will expire; and
a processor operatively coupled to the memory for executing one or more of the applications on the mobile device, to determine when place data is required for the one or more applications, and to obtain the place data required for the one or more applications on the mobile device from the single centralized place data store.

15. The mobile device as claimed in claim 14 wherein the single centralized place data store comprises, for each place:
a place tag identifying the place, wherein the place includes either a physical location or a virtual location; and
location coordinates for the physical location or a user-specified virtual location descriptor that identifies the virtual location to the user.

16. The mobile device as claimed in claim 15 wherein the single centralized place data store comprises, for each place:
a data owner identifier that identifies an application that owns the data.

17. The mobile device as claimed in claim 15 wherein the single centralized place data store comprises, for each place:
a set of rules specifying how the data is to be shared.

18. The mobile device as claimed in claim 15 wherein the single centralized place data store comprises, for each place:
a set of relationships identifying contacts related to the place.

19. The mobile device as claimed in claim 15 wherein the single centralized place data store comprises, for each place:
a set of actions to be performed at the place.

20. The mobile device as claimed in claim 14 wherein the processor and memory cooperate to:
monitor usage of location data by a user of a mobile device when located at a place;
derive contextual information about the place and the personal preferences of the user with respect to the place; and
integrate the contextual information as additional place-related data.

* * * * *